April 4, 1967 R. T. HEATH 3,312,788

SHIELDED TAPE TRANSPORT

Filed Jan. 14, 1965 2 Sheets-Sheet 1

INVENTOR.
ROY T. HEATH

BY

Christie, Parker & Hale
ATTORNEYS.

April 4, 1967 R. T. HEATH 3,312,788

SHIELDED TAPE TRANSPORT

Filed Jan. 14, 1965 2 Sheets-Sheet 2

INVENTOR.
ROY T. HEATH
BY
Christie, Parker & Hale
ATTORNEYS.

3,312,788

SHIELDED TAPE TRANSPORT

Roy T. Heath, Arcadia, Calif., assignor to Consolidated Electrodynamics Corporation, Pasadena, Calif., a corporation of California Filed Jan. 14, 1965, Ser. No. 425,457
1 Claim. (Cl. 179—100.2)

This invention relates to tape transports and in particular to a tape transport provided with shielding to protect the transport from and to prevent the emission of radio frequency signals during operation of the transport.

With the continued emphasis on increased capacity and high speed in computers and telemetry installations, tape transport design has had a premium placed on increased bandwidth. With bandwidths now extending into the megacycle range, transports have increasingly become a source of and susceptible to high frequency interference. To combat the problem, it has been found necessary to provide some means whereby the transport can be shielded.

In the past when this need has arisen, it has been the signal for the initiation of a series of analyses to determine whether each component of a given system is sensitive to or capable of acting as a possible source of radio frequency interference. When the analyses are complete, design steps are taken, where required, to shield that particular component of the transport system. Proceeding in this fashion, serious economic consequences have been encountered because the number of components comprising a system can be sizeable entailing a commensurate amount of time and effort required to complete the analysis. For example, in the case of a typical tape transport, there are amplifiers, power supplies, capstan power amplifiers, and the tape transport itself.

The present invention provides a method for solving this problem by the expedient of housing an entire system within a radio frequency shielded enclosure. The enclosure comprises a metal cabinet in which all the seams joining parts of the cabinet are sealed electrically to provide complete electrical continuity. At least one side of the cabinet is open for permitting access to the interior of the enclosure, and on the border defining this open side of the cabinet a metal frame is mounted which is in electrical contact with the cabinet throughout its perimeter. An electrically conductive door mounted on this frame is provided with means for securing it to the frame whereby when closed, the door, frame and cabinet combine to form a closed electrical circuit.

The invention further contemplates provision of shielded means for obtaining visual access into the interior of the enclosure for purposes of observation and control of the system enclosed therein. This means of observation is contemplated to be provided by means of metal screening which is secured to some part of the enclosure, for example, the door, and in electrical contact therewith. To provide mechanical support for this metal screening, an additional sheet of plastic or glass material can be mounted on either side of the screening. In this fashion, the tape transport reels, meters, etc., can be observed without disturbing the shielding function of the enclosure.

Finally, in the instances where it is necessary to control the operation of the transport externally while the system is in operation, the invention contemplates means external of the enclosure for providing control, again without disturbing the continuity of the electrical shielding which this enclosure provides. In one embodiment, these controls are provided by means of plastic rods which extend through close fitting metallic bushings in the doors or walls of the enclosure. The bushings are fabricated in lengths corresponding to electrical waveguides for purposes of arresting possible radio frequency interference.

These and other advantages of the invention will be more fully understood by reference to the following figures, in which.

Figure 1:
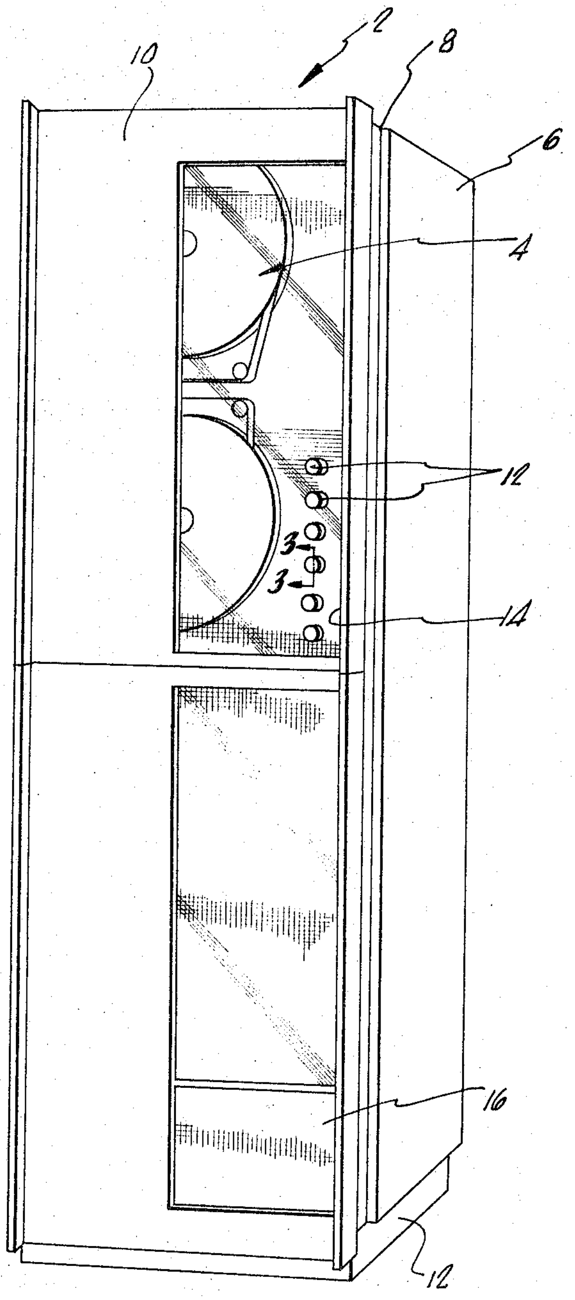
FIG. 1 is a perspective view of the front of a transport enclosed in a shielding enclosure of this invention.

Referring now to FIG. 1, there is shown an enclosure 2 housing a tape transport system 4 which is to be shielded. The enclosure comprises a main cabinet 6 on which is mounted a metal frame 8 which in turn has mounted on it a door 10. The entire cabinet is then mounted on a stand 12 which may be affixed to the cabinet by welding around its entire perimeter to provide complete electrical continuity at the bottom of the enclosure.

To obtain effective shielding, it is important that the enclosure assembly be electrically continuous throughout. To accomplish this, all seams of the enclosure are sealed with a conductive sealant such as solder. As will be demonstrated in more detail in conjunction with the description in FIGS. 2A and 2B, certain additional provisions are made to insure satisfactory frame-to-enclosure and door-to-frame continuity.

There are several ways in which the door can be mounted on the enclosure to insure that the combination of door and enclosure provide effective shielding for the system placed within it. One way in which this may be accomplished is by means of a door mounting frame 8 which is adapted to be attached to the front of the enclosure. Such a frame will be described in more detail in conjunction with FIGS. 2A and 2B. Another way in which a door may be adapted to provide satisfactory electrical continuity between it and the enclosure is to provide a metallic gasketing material around the border of the door which is adapted to be compressed between the door and border when the door is closed.

One form of this gasketing is a material designated finger stock. Finger stock is essentially a continuous strip of beryllium copper which is provided with fingers or serrations continuously along one edge. When mounted, around the border of an opening in the enclosure, such serrations are adapted to be engaged and compressed when the door is swung to the closed position thereby providing good electrical contact between door and enclosure. A second type of gasketing material is described in conjunction with the description of the door mounting frame 8.

The door 10 can be provided with a number of apertures or windows for providing visual access to the system contained within the enclosure. Such a window 14 is illustrated in FIG. 1. Window 14 is shielded by providing copper or other metal screening covering the entire opening and overlapping it on all sides. To lend mechanical stability to the screening, it may be desirable to sandwich it between sheets of glass or plastic before mounting the door 10. Whether or not such stabilization is employed, is it important that the screening be secured by means of a good electrical contact to the door 10 or other portion of the cabinet in which it may be mounted in order that the shielding will be complete. Where supporting sheets are used around the screening, the assembly is designed such that the screening is larger than the sandwiching plates so that good metal-to-metal contact between the cabinet and screening can be obtained.

Control buttons 12 extend through bushings of predetermined size to provide transport control without opening enclosure door 10.

Provided near the base of the door is a second screen 16 also mounted in electrical continuity with the door to provide a means for drawing air into the cabinet so that it may be circulated therein to maintain the temperature of the power supplies and other equipment at a desired level. Since blowers normally associated with a tape transport system are mounted in the bottom of the system, the air intake screens are provided in the bottom of the cabinet adjacent the blower location. While the particular embodiment shown in FIG. 1 shows the air intake in the door, it can also be provided in any other part of the cabinet, depending on the orientation of the associated blower.

In those instances where it is necessary to have access to the back of the tape transport system, the enclosure can be provided with a rear door. This rear door can be mounted in a manner similar to the front door. However, since the need for access to the rear of a transport enclosure is limited, especially in view of the drawer type rack by which components are normally mounted, the rear door is normally smaller than the front door, inset within a portion of the rear of the enclosure and provided with a continuous length of metallic gasketing material around its rim. When the rear door is closed, this material abuts and is compressed by the border defining the opening in the rear of the enclosure to provide the necessary electrical continuity in this area of the enclosure.

Figure 2B:
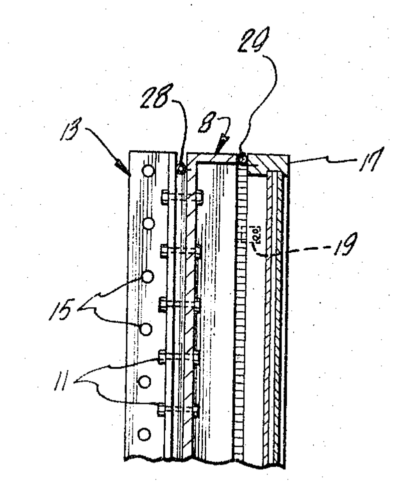
FIG. 2B is a section view along lines 2B—2B of FIG. 2A.
Figure 2A:
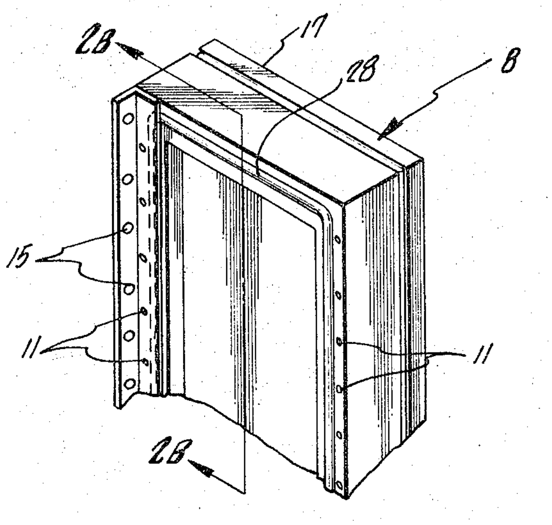
FIG. 2A is a perspective view of the enclosure door and the frame on which it is mounted.

A portion of the metal frame 8 on which a door 17 is mounted is shown in FIG. 2A and FIG. 2B. Frame 8 is made of a suitable conductive material and is provided with a number of bolt holes 11 by means of which it is mounted on mounting rails 13 attached at the front of the shielding enclosure. Industry standards for magnetic tape transports require that enclosures for such transports be provided with rails running the length of the enclosure on each side of an opening therein. In radio frequency shielded enclosures, such rails are attached to the enclosure by bolt holes 15 in such a manner that they are electrically continuous therewith. It is to these rails 13 that the door mounting frame 8 is attached. A metallic gasketing material 28 is secured to the rear of the frame around its entire perimeter. This gasketing material serves the function of providing an electrical contact between the frame and the mounting rails 13.

As shown in FIG. 2B, the door 17 is mounted on the frame by means of a hinge 19 and is also provided with gasketing material 29 around its perimeter. By providing draw-in type catches or other similar securing means, the door can be caused to mount securely against and compress gasketing material 29 to insure a satisfactory electrical contact.

One example of gasketing material which has been previously described is finger stock. A second example of such material is a continuous length of braided stainless steel cable. Such a material is available in a number of sizes and shapes and in some cases is hollow and has a sponge rubber core running through the center. Where this gasketing material is provided in the form of a cable, it can also be provided with a tail-like arrangement extending from one side of the cable, adapted to fit in a groove placed in the frame for more substantial mounting to the frame. FIG. 2 illustrates gasketing material mounted in this manner.

Figure 3:
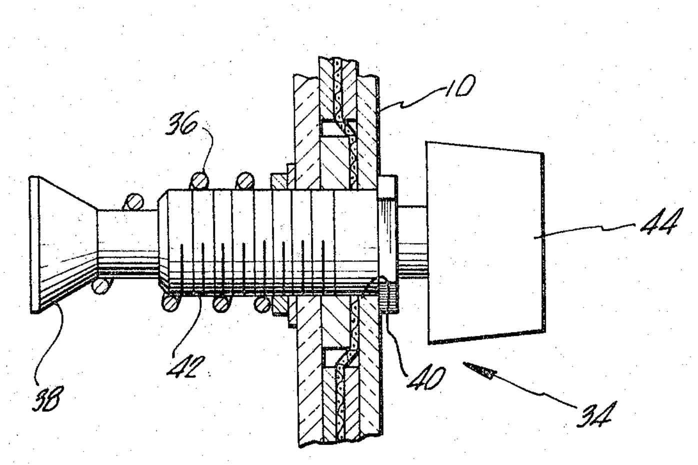
FIG. 3 is a view taken along lines 3—3 of FIG. 1 showing the use of external controls to control the operation of the tape transport.

The gasketing material provided on the door mounting frame may be further improved by combining this braided cable with finger stock. In such a variation, the finger stock material is attached to the cable material such that the fingers or serrations reach around and over the cable. When the enclosure door is brought to a closed position, the serrations are compressed against the cable thereby giving electrical continuity. Such a variation is useful because the braided cable gasket is sensitive to abrasion whereas the finger stock withstands abrasion very well and protects the cable from wear due to opening and closing of the door mounted on frame 8.

Where deemed necessary, the cabinet can be provided with means for controlling the operation of the tape transport system enclosed within the cabinet without opening the enclosure doors. One way in which this control can be exerted is shown in FIG. 3. In that figure, control 34 extends from exterior of the enclosure through the door to the interior. This control comprises a plastic rod 38, preferably of acrylic plastic, which is adapted to abut the component to be controlled and passes through a spring 36 and a close fitting metallic bushing 42 in a hole 40 in the front door of the enclosure. Bushing 42 is selected such that it has the dimensions of an attenuating waveguide. It then has the effect of acting as a high pass filter, i.e., all frequencies, up to, for example 7 mc. are attenuated to a sufficient degree that such signals no longer have strength to act as interference. Control knobs 44 are provided on the plastic rods 38. Markings that may be required to identify these controls should preferably be placed on the door 10 or knobs 44. The use of acrylic plastic in rods 38 makes possible the provision of back lighting of controls and the advantages inherent therein.

The result is an easily engineered and economically manufactured radio frequency shielding enclosure for any type of electronic system and in particular tape transports. Whereas formerly many hours had to be spent on the analysis of various components of a system and subsequent design work to provide radio frequency shielding or suppression for each component, the present invention provides an extremely simple means and one that represents a substantial saving, both in engineering and production costs. The enclosure may be of any size and any shape and is simply determined by the outside dimensions of the system to be enclosed.

What is claimed is:

A radio frequency shielded magnetic transport system comprising:

a system support, a tape transport module including at least one capstan drive motor mounted on the system support, amplifier means mounted on the system support, a power supply for supplying electrical energy to the system, including the amplifier means and tape transport module, the power supply being mounted on the system support, a control module including electrical circuitry interconnecting the system controls with the transport module, amplifier means and power supply, a unitary housing enclosing the system support, transport module, power supply, amplifier means and control module on all sides thereof, the enclosure defining at least one doorway and at least one auxiliary aperture, said enclosure being fabricated such that all surfaces thereof are electrically continuous, a pair of mounting rails mounted on opposite sides of said doorway in continuous electrical contact therewith, a frame mounted on said mounting rails, continuous electrical contact between the frame and rails being established by means of a first length of electrically conductive gasketing material, a door hingedly mounted on said frame, said door defining at least one viewing aperture therein and at least one control aperture, first electrically conductively meshed attenuating means drawn across the viewing aperture in the enclosure door, said attenuating means being supported on at least one side by a rigid, transparent plate, second electrically conductively meshed attenuating means drawn across the auxiliary aperture in the enclosure, both of said attenuating means being secured to the enclosure and door in an electrically continuous relation therewith, and a shaft of light transmissive control means passing through the control aperture, said control means being supported in the aperture by an electrically conductive bushing, the length of the bushing corresponding to that of an attenuating wave guide whereby visual, thermal, and control access to the interior of the enclosure is provided to an operator located externally of the system while the ingress and egress of radio frequency electrical energy into and out of the system is substantially curtailed.

References Cited by the Examiner

UNITED STATES PATENTS

| | | | |
|---|---|---|---|
| 546,802 | 9/1895 | Ayrton | 174—35 |
| 1,576,162 | 3/1926 | Van Dyck | 174—35 |
| 2,221,944 | 11/1940 | Goddard | 217—35 X |
| 2,358,352 | 9/1944 | Sherwood | 116—124 X |
| 2,487,547 | 11/1949 | Harvey | 174—35 X |
| 2,623,981 | 12/1952 | Anderson et al. | 174—35 |
| 2,780,705 | 2/1957 | Siegmeth | 174—35 X |
| 2,925,457 | 2/1960 | Lindgren | 174—35 |
| 2,958,754 | 11/1960 | Hahn. | |
| 3,045,072 | 7/1962 | Brede | 179—100 |
| 3,055,969 | 9/1962 | Schaller | 174—35 |
| 3,129,278 | 4/1964 | Watts et. al | 174—35 |

FOREIGN PATENTS

| | | |
|---|---|---|
| 768,996 | 2/1957 | Great Britain. |

LEWIS H. MYERS, *Primary Examiner.*

DARRELL L. CLAY, *Examiner.*